US010295966B2

(12) United States Patent
Blackhall et al.

(10) Patent No.: US 10,295,966 B2
(45) Date of Patent: May 21, 2019

(54) SYSTEMS, METHODS, AND DEVICES FOR MANAGING/CONTROLLING ENERGY PRODUCTION AND/OR ENERGY STORAGE SYSTEMS

(71) Applicant: Reposit Power Pty Ltd, Fyshwick, Australian Captial Territory (AU)

(72) Inventors: Lachlan John Emblen Blackhall, Griffith (AU); Corrado Dean Paul Spaccavento, Lyneham (AU)

(73) Assignee: Reposit Power Pty Ltd., Fyshwick, ACT (AU)

(*) Notice: Subject to any disclaimer, the term of this patent is extended or adjusted under 35 U.S.C. 154(b) by 0 days.

(21) Appl. No.: 15/511,980

(22) PCT Filed: Sep. 16, 2015

(86) PCT No.: PCT/AU2015/000573
§ 371 (c)(1),
(2) Date: Mar. 16, 2017

(87) PCT Pub. No.: WO2016/040991
PCT Pub. Date: Mar. 24, 2016

(65) Prior Publication Data
US 2017/0300019 A1  Oct. 19, 2017

Related U.S. Application Data

(60) Provisional application No. 62/051,597, filed on Sep. 17, 2014.

(51) Int. Cl.
G05B 13/04 (2006.01)
G05B 13/02 (2006.01)
(Continued)

(52) U.S. Cl.
CPC ....... *G05B 13/041* (2013.01); *G05B 13/0265* (2013.01); *G06Q 10/06* (2013.01); *G06Q 50/06* (2013.01); *H02J 7/0013* (2013.01)

(58) Field of Classification Search
CPC . G05B 13/041; G05B 13/0265; H02J 7/0013; G06Q 50/06
See application file for complete search history.

(56) References Cited

U.S. PATENT DOCUMENTS 3,872,286 A * 3/1975 Putman .................. G06Q 50/06
705/412
3,906,242 A * 9/1975 Stevenson ................ H02J 3/14
219/485

(Continued)

OTHER PUBLICATIONS

International Search Report dated Nov. 4, 2015 for PCT/AU2015/000573.

*Primary Examiner* — Ramesh B Patel
(74) *Attorney, Agent, or Firm* — Jones Day

(57) ABSTRACT

A method for controlling an energy storage system which includes receiving time-series data and customer specific data and developing one or more customer specific control models based, at least in part, on the time-series data and the customer specific data. After developing one or more customer specific control models, the method proceeds by training the customer specific control models and then deploying the customer specific control model to the customer for use by the customer to determine which of a plurality of modes the energy storage system should be in. The method may include the development, deployment and/or execution of one or more centralized control models for controlling a network of any combination of common and/or different customer control models.

25 Claims, 2 Drawing Sheets

(51) Int. Cl.
*H02J 7/00* (2006.01)
*G06Q 50/06* (2012.01)
*G06Q 10/06* (2012.01)

(56) References Cited

U.S. PATENT DOCUMENTS

| | | | | |
|---|---|---|---|---|
| 2010/0127664 A1* | 5/2010 | Paice | ............... | H02J 3/32 320/134 |
| 2012/0022700 A1* | 1/2012 | Drees | ............... | G05B 15/02 700/276 |
| 2012/0130556 A1 | 5/2012 | Marhoefer | | |
| 2014/0039710 A1* | 2/2014 | Carter | ............... | G06Q 10/06 700/291 |
| 2014/0156031 A1* | 6/2014 | Anderson | ............... | G06Q 10/06 700/29 |
| 2014/0172182 A1* | 6/2014 | Subbotin | ............... | H02J 3/383 700/291 |
| 2014/0172503 A1* | 6/2014 | Hammerstrom | ... | G06Q 30/0206 705/7.31 |
| 2014/0214219 A1* | 7/2014 | Katayama | ............... | G06Q 50/06 700/291 |
| 2014/0245071 A1* | 8/2014 | Drees | ............... | G05B 15/02 714/39 |
| 2014/0330695 A1* | 11/2014 | Steven | ............... | G06Q 30/0283 705/37 |

\* cited by examiner

SYSTEMS, METHODS, AND DEVICES FOR MANAGING/CONTROLLING ENERGY PRODUCTION AND/OR ENERGY STORAGE SYSTEMS

CROSS-REFERENCE TO RELATED APPLICATIONS

This application is the National Phase application of International Application No. PCT/AU 2015/000573, filed Sep. 16, 2015, designates the United States and was published in English, which claims priority to U.S. Provisional Application No. 62/051,597, filed on Sep. 17, 2014. These applications, in their entirety, are incorporated herein by reference.

FIELD OF THE DISCLOSURE

This disclosure relates to systems, methods, and devices for managing distributed and/or non-distributed energy production and/or storage systems. More particularly, this disclosure relates to systems, methods, and devices for managing/controlling distributed and/or non-distributed energy production and/or storage systems by using combinations of time series data and customer specific data to manage/control the benefits of energy production and/or storage systems individually and as a network of systems and improve power grid efficiency and/or stability.

BACKGROUND

Today, there are numerous alternatives to obtaining energy exclusively from the power grid. For example, many commercial and residential premises are utilizing alternative energy sources such as wind, solar or other energy sources to generate electricity. However, many of these alternative energy sources are unreliable, inconsistent and/or intermittent. For example, the sun and the wind may vary from one day to the next, making it difficult to rely exclusively on any one or more of these alternative energy sources. To assist, commercial and residential premises are increasingly installing energy storage systems (e.g., batteries). Batteries are able to store energy, making it available as and when necessary. For example, solar energy received during the day can be stored in energy storage systems and utilized later at night; wind energy can be stored during windy times and consumed in later less windy times; and so on.

In general, energy storage may have a multiplicity of uses. For example, energy storage systems may be utilized for energy arbitrage—the process of storing energy at times when it has low market value and selling or otherwise consuming it at times of higher value. Energy storage devices may also be useful for voltage or frequency correction on the grid. For example, the energy storage system may either rapidly discharge or charge if it detects a change in frequency that might arise due to a sudden loss of renewable generation or the loss of a load or a voltage change. Energy storage devices may also be used to deliver power and energy services directly to energy and ancillary services markets through, for example, contractual arrangements.

However, despite the potential customer- and/or network-related benefits, none of the many uses for energy storage on their own are likely to render them sufficiently economically attractive to merit installation.

Accordingly, it is desirable to have systems, methods, and devices for managing energy storage systems, which are capable of utilizing the multiplicity of capabilities of the energy storage systems to improve the electrical and economic benefits of energy storage.

SUMMARY

Exemplary embodiments described herein may provide a method for controlling an energy storage system, the method comprising: receiving time-series data and customer specific data; developing a customer specific control model based at least in part on the time-series data and the customer specific data; training the customer specific control model; and deploying the customer specific control model to the customer for use by the customer to determine which of a plurality of modes the energy storage system should be in.

In exemplary embodiments, the mode of the energy storage system may comprise a mode (e.g., charge, discharge, do nothing) and a magnitude of the action. Although the modes and magnitudes described herein may be described separately, it should be well understood that in exemplary embodiments, the modes and magnitudes may actually correspond to a continuous spectrum of operations. It should be clear that a position on the spectrum may be selected in a single operation or in multiple operations. For example, in an exemplary embodiment, the modes may be a substantially continuous set of values signifying whether to charge, discharge or do nothing (e.g., a series of positive values, negative values, and zero).

In exemplary embodiments, the plurality of modes of the energy storage system may comprise any combination of a charging mode, a discharging mode, and a do nothing mode.

In exemplary embodiments, the plurality of modes of the energy storage system may further comprise any combination of producing or consuming real and/or reactive power, or do nothing.

In exemplary embodiments, the plurality of modes of the energy storage system may further comprise an indication of the desired net flow of energy, comprising any combination of real and/or reactive, into or out of the energy storage system.

In exemplary embodiments, the customer specific control model may be configured to maximize a financial return from the energy storage system by selling energy back to the network at commercially advantageous times as determined by the customer specific control model. In exemplary embodiments, the control model may be configured to minimize, maximize, or merely alter any number of given parameters in addition to financial return or market value.

In exemplary embodiments, the customer specific control model may be configured to correct for frequency deviations over a range of time scales.

In exemplary embodiments, the customer specific control model may be configured to correct for any combination of real and/or reactive voltage or a voltage range by consuming or producing any combination of real or reactive power.

In exemplary embodiments, the customer specific control model may be configured to fulfill an energy related contract for producing or consuming any combination of real or reactive power over a contract specified period of time and geographic region.

In exemplary embodiments, any combination of common or unique customer specific control models for a plurality of customers may be collectively controlled by a centralized system to optimize the ability of the system as a whole to fulfill the temporal, spatial and/or real and/or reactive power needs of the power network, such as correcting for frequency deviation, voltage deviation, fulfilling an arbitrary energy related contract, etc.

In exemplary embodiments, the customer specific control model may be updated by deploying an update of the model to the customer (e.g., by pushing the update).

In exemplary embodiments, the customer specific control model may be deployed by physical connection to the controller of a portable electronic storage device containing an updated control model.

In exemplary embodiments, the customer specific control model may be deployed via a wireless communications channel, such as a mobile cellular network which may or may not include a secure connection such as a virtual private network.

In exemplary embodiments, the customer specific control model may be deployed via the customer's connection to a public communications network via a wired (such as Ethernet) or wireless (such as WiFi) communications channel, which may or may not include a secure connection such as a virtual private network.

In exemplary embodiments, the control model may utilize information about the customer configuration and/or characteristics to determine which of a plurality of modes the energy storage system should be in.

In exemplary embodiments, a different customer specific control model may be developed for different customers.

In exemplary embodiments, the time-series data may comprise any combination of historical energy market information, environmental information, electricity usage and/or generation from the commercial or residential premises, weather services, and/or financial data related to macro and micro economic conditions, and other time-series data.

In exemplary embodiments, the customer specific data may comprise any combination of the location of the customer, the customer preferences, electricity retail contract information, network provider information, electrical details about the connection point, information about the configuration and characteristics of any energy generation, information about the energy storage system, and/or any other information as needed.

In exemplary embodiments, the data may be validated prior to being utilized to develop the customer specific control model.

In exemplary embodiments, the energy storage system may comprise at least one energy storage cell.

In exemplary embodiments, the customer specific control model may comprise a plurality of modules which are configured to be executed in a predetermined manner based, at least in part, on a linked relationship between the modules and output parameters and/or the type of event received. Alternatively, in exemplary embodiments, the control model may be dynamically implemented. For example, the model may be configured on the fly during operation or reconfigured during operation or merely switched/replaced with an alternative model during operation.

Exemplary embodiments described herein may provide a system for controlling a plurality of energy storage systems associated with a corresponding plurality of customers, the system comprising: at least one storage device configured to store time-series data and customer specific data for a plurality of customers; at least one centralized processor configured to: (i) receive the time-series data and the customer specific data for a plurality of customers; (ii) develop one or more customer specific control models for a plurality of customers individually or as one or more groups based at least in part on the time-series data and the customer specific data of the corresponding customer; and (iii) train the customer specific control models; a plurality of controllers associated with a corresponding plurality of customer energy storage systems, wherein the plurality of controllers is configured to receive a corresponding customer specific control models to determine which of a plurality of modes the energy storage system corresponding to the customer should be in.

In exemplary embodiments, the system may comprise one or a plurality of centralized models for centrally controlling or managing models for a plurality of customers where customers may or may not share the same model.

In exemplary embodiments, the system may comprise one or a plurality of centralized models centrally controlling or managing models for a plurality of customers to optimize the economic, electrical or other operation of a plurality of customer models as one or more groups.

In exemplary embodiments, the system may comprise one or a plurality of centralized models for centrally controlling or managing models for a plurality of customers where the centralized model or models may vary from time-to-time and may manage varying customers and customer models from time-to-time.

Other aspects, features, and advantages will become apparent from the following description when taken in conjunction with the accompanying drawings, which are a part of the disclosure and which illustrate, by way of example, principles of the embodiments disclosed herein.

DESCRIPTION OF THE DRAWINGS

Notwithstanding any other forms which may fall within the scope of the disclosure as set forth herein, specific embodiments will now be described by way of example and with reference to the accompanying drawings in which.

DESCRIPTION OF EXEMPLARY EMBODIMENTS

Figure 1:
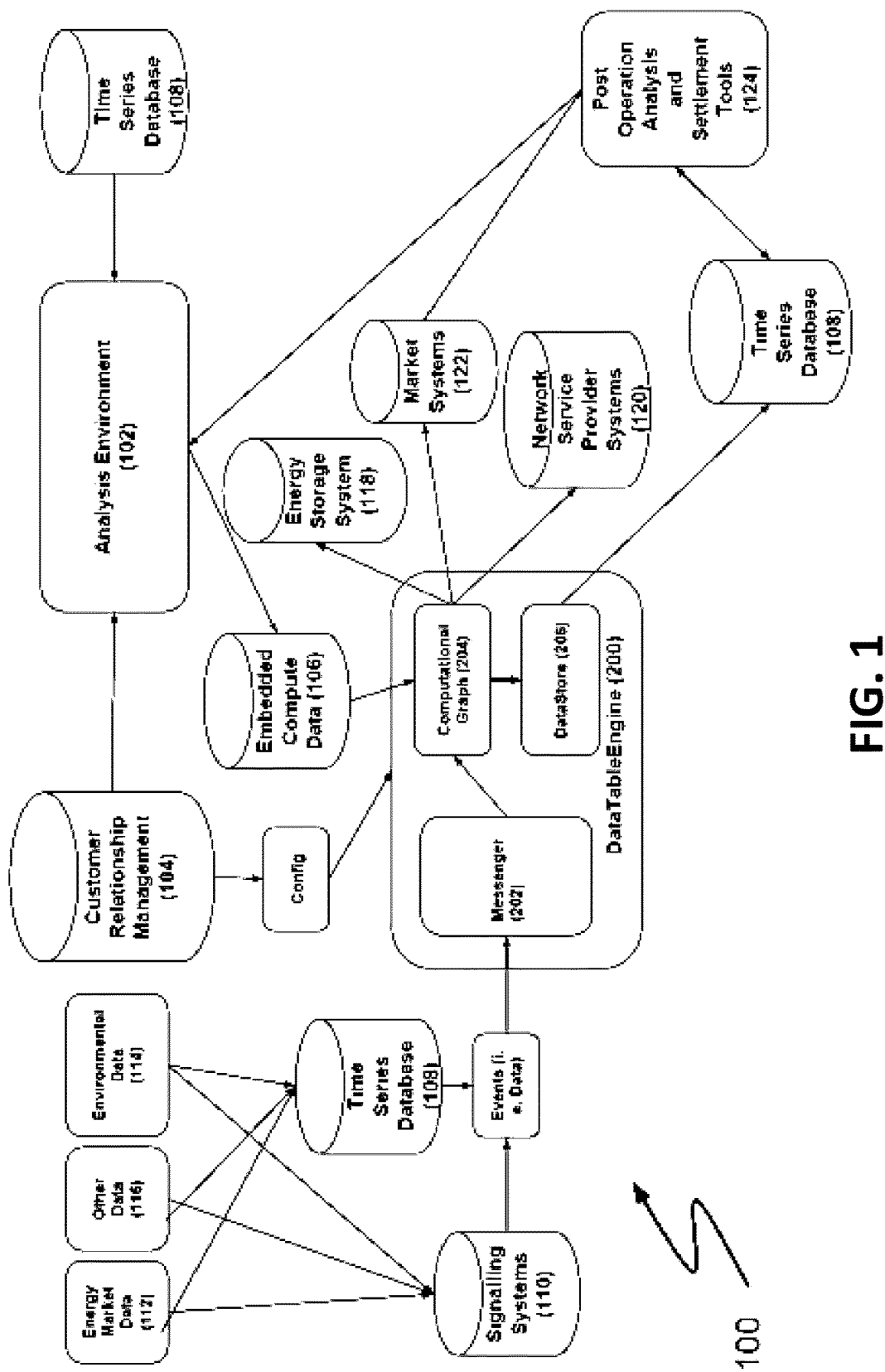
FIG. 1 is an exemplary embodiment of a system for managing an energy storage system.

Energy storage is a tool that can be used to solve several different problems faced by today's electricity grid. Despite its benefits, rendering electricity storage cost effective remains a significant challenge.

Exemplary embodiments described herein relate to systems, methods and devices which allow an energy storage system to manage a consumer's electricity usage patterns, manage real and/or reactive load and voltage on the local grid, and trade on electricity markets, either individually or as part of a plurality of individual electricity consumers and producers. By using energy storage devices to solve several problems simultaneously, the systems and devices described herein improve the operation and performance of the electricity grid and the economics of energy storage systems and electricity consumption more generally.

In most modern electricity grids, engineering requirements are converted into financial quantities which allow distinct generators, and a multiplicity of other energy participants, to work together in concert. For example, using centralized market mechanisms, a shortage of electricity supply relative to demand may manifest itself as a high spot price. In turn, the high spot price attracts additional generation. The systems, devices, and methods described herein use these same financial signals as the underlying basis for controlling one or more energy storage systems.

In electrical systems, it is vital that supply precisely matches consumption. When electricity grids were first designed there was no way to control consumption so the system was designed to precisely control generation. Consumption was essentially random but the aggregate load was well understood and could be easily met by the controllable mix of fossil fuel, hydroelectric, and/or other power generation. This design was successful for many decades. However, with the recent addition and growing popularity of distributed power production, such as rooftop solar panels and large renewable farms (and other renewable energy), the situation has been altered. Unfortunately the high geographic correlation of renewable energy means that consumption is no longer random. For example, a cloud front may pass many solar panels simultaneously causing rapid fluctuations in solar power production, and hence consumption. Because the consumption is no longer random, the aggregate consumption may be less predictable than before. The less predictable loads make it increasingly difficult for the controlled generation to match this aggregate consumption. In addition to less predictability on the consumption side, it should be readily understood that as more alternative generation (e.g., wind, solar, etc.) is utilized, there may be less predictability on the generation side as well.

In some geographies the traditional electricity production system is reaching its technical capacity to absorb more renewable energy and remain stable.

In exemplary embodiments, the systems, methods, and devices described herein may reduce or eliminate these problems. In particular, the systems described herein may connect behind-the-meter storage to grid control systems. As a consequence it controls the behavior of the storage in accordance with the needs of the system. If the system demands generation (as represented by a high spot price), then the described system may respond by sending a discharge signal to the battery. In an alternative situation, if solar panel generation unexpectedly drops off and causes a frequency dip, then a controlled energy storage system may export any combination of real and/or reactive energy to the network to equalize the supply and demand of energy.

Although exemplary embodiments are described herein with reference to on-grid applications, it should be readily understood that similar optimization may be achieved in an off-grid environment or if the energy market is decentralized or manufactured.

In exemplary embodiments, the net result of this type of storage control is that distributed energy production, such as solar, wind and other time-varying forms of energy production, particularly those at the end of the grid such as roof-top panels, can work in harmony with the traditional controlled generators.

In exemplary embodiments, the systems, methods and devices described herein may deliver these benefits by working towards maximizing revenues, e.g., participating in the most financially advantageous wholesale energy, ancillary services market, bilateral contract, etc. at any given moment.

For example, energy storage may be dispatched (e.g., real and/or reactive charge or discharge, or do nothing) in response to any combination of the following conditions, including:

Price signals in the wholesale energy market or ancillary services market;
Price signals in the distribution network;
Operational conditions (capacity, faults, etc.) in the transmission or distribution networks;
Generation capacity, constraints, and faults of generators connected to the transmission or distribution networks;
Operational requirements, consumption, or usage patterns of an individual residence or premises connected to the distribution network;
Price signals in the retail contract of an individual residence or premises connected to the distribution network;
Environmental factors (temperature, wind speed, etc.); and/or
Contracts for energy storage services/financial contracts (derivatives) backed by storage capability.
Contracts to deliver real and/or reactive power in response to an explicit request for real and/or reactive power of a specified magnitude.
Contracts to deliver real and/or reactive power in response to an explicit request based on a constraint in the distribution or transmission network.

Accordingly, in exemplary embodiments, the dispatch of energy storage (e.g., using information from above sources) may be optimized to maximize the financial return of one or more energy storage systems (e.g., by simultaneously satisfying the requirements of multiple energy and power services) operating individually or as a plurality of energy storage systems operating collectively.

Exemplary embodiments described herein may include systems, methods, and devices for using time-series data such as, e.g., historical energy market information, environmental information and other time-related information, along with customer-specific data to develop and/or test one or more computational models and/or control models (e.g., computational graphs) to manage/control an energy storage system. In exemplary embodiments, the energy storage system may be one or more batteries, a battery management system (BMS) and an inverter. In exemplary embodiments, the one or more batteries may be located at a customer's premise (e.g., a home or office building).

In exemplary embodiments, the system may manage and/or control the energy storage system to increase the benefit. For example, the controller may ensure that there is sufficient charge to deliver valuable services throughout the day by potentially charging overnight when electricity is typically cheaper. During the day it may identify the most valuable opportunities, being mindful of the (potentially lost) opportunity cost of delivering other services during the day, and deliver energy and power to satisfy those service requirements. Examples of this are charging overnight when energy is cheap. Charging from solar in the morning when the sun first rises. Avoiding network charges in the afternoon when peak network pricing is in place, etc. For example, in embodiments, the system may control the energy storage system to improve (e.g., maximize) a financial return on the energy storage system. In exemplary embodiments, the systems, methods, and devices described herein may be capable of achieving up to about 10%, 20%, 30%, 40%, 50%, 60%, 70%, 80%, 90%, 100%, 125%, 150%, 175%, 200%, 250%, 300%, or 400% increase in the financial return of the energy storage system.

In exemplary embodiments, the system may operate on individual energy storage systems or a plurality of energy storage systems may be pooled together and share a common model. For example, in exemplary embodiments, individual commercial or residential premises in a neighborhood may have their own individual model or a single model may be shared by the neighborhood. Exemplary embodiments described herein may also include one or more centralized systems, methods and devices for coordinating, managing, controlling, and/or optimizing the collective control of a plurality of customers' control models, where such customer control models may or may not comprise one or a plurality of control models which may or may not be common to a plurality of customers. Exemplary embodiments described herein may also include one or more centralized systems, methods and devices for coordinating, managing, controlling, and/or optimizing the collective control of a plurality of customers' control models to optimize their control to achieve specific network and/or economic benefits from time-to-time, where such customer control models may or may not comprise one or a plurality of control models which may or may not be common to a plurality of customers.

In exemplary embodiments, the systems, methods and devices may be configured to develop customer-specific models and then deploy (e.g., push) the model out to the respective customer's energy storage controller. In a similar manner, updates, revisions, corrections to the models may also be deployed (e.g., push) to the respective energy storage controllers.

Along with the control model, in exemplary embodiments, specific customer configuration information may also be sent. In exemplary embodiments, the specific customer configuration information may allow the controller to operate in a parameterized fashion. This type of a structure may help ensure that while multiple customers may share a common control model, each controller is unique in the control decisions it delivers at each unique customer. For example, two customers living next door to one another may be in the same market region for wholesale energy, may be on the same network, may have the same retailer etc. However, these two customers may have different battery systems. Accordingly, the controller, which may be identical for both customers, may be parameterized according to the specifications of the specific battery system. In this way it is possible the systems may make the same decision (i.e. charge, discharge, do nothing) but the magnitude of the decision may be different depending on the battery specification.

In operation, the systems, devices, and methods may transmit (e.g., push) time-series data to the client controllers. In exemplary embodiments, the time-series data may comprise energy and ancillary market prices, local weather data (or likely weather predictions for that region), likelihood of network events if that data is available, etc. The client controllers may then utilize their control model and the data to compute commands and/or actions to the energy storage system, the market, etc. In exemplary embodiments, the commands and/or actions may be performed in real time or at least substantially real time.

In exemplary embodiments, the systems, methods, and devices described herein may be configured to analyze, manage, control, and/or monitor thousands or even hundreds of thousands of energy storage systems at the same time where such energy storage systems may or may not share one or more common control models.

In exemplary embodiments, the system may be configured for monitoring purposes without battery control. For example, the system may provide graphs and data to customers but not control or manage an energy storage system. In exemplary embodiments, the system may analyze the data to suggest system or behavioral changes to alter energy consumption patterns.

In exemplary embodiments, the system may be configured to include a consumer application configured to display certain data to customers. For example, in exemplary embodiments, the consumer application may comprise a user interface configured to display data relating to energy generation, consumption, storage, and usage. The application may allow the customer to monitor and/or modify energy consumption behaviors or merely alter when energy is consumed. For example, it may be possible to configure the customer application to suggest to the customer, changes in activities that would reduce the amount of imported energy required (e.g., running the washing machine at a particular time, etc.).

In addition, applications/interfaces may be provided to retailers, network operators and/or customers to view particular statistics on different systems. For example, in an exemplary interface, a map may be provided with battery icons at locations where controllable energy storage systems (i.e. batteries) are located. It may be possible for users of the interface to view statistics of the various systems, purchase options for dispatching energy, actually dispatch energy from the energy storage system into the electricity network, etc. The interface may also allow further control (in a variety of forms) of the various energy storage systems.

Exemplary embodiments described herein may provide systems, methods, and devices that manage, monitor, and/or control energy storage systems that are connected to the electricity grid. In embodiments, the system may comprise (i) software/hardware that is located on a central architecture and interacts with existing market, network and vendor systems, (ii) software/hardware that is located on central architecture which simulates the value of deployed energy storage, automates the creation and deployment of embedded software to manage, optimize and control deployed energy storage systems and/or monitors the performance of deployed energy storage against ideal simulations performed on either historical data or running in real time on the server but not controlling real hardware, and (iii) distributed control software/hardware which is deployed and physically located on a small computer adjacent to or part of the energy storage system. The control software/hardware issues commands to the installed energy storage system to command its operation (charge, discharge, do nothing) in order to maximize (or at least improve) a return on investment.

In order to realize the value of energy systems installed on the electricity market, in exemplary embodiments, the system may be configured to actively participate in an electricity market (e.g., The National Electricity Market (NEM) in Australia). To do this, in exemplary embodiments, a number of licenses may be required.

Through market participation or bi-lateral contracts the system may be able to generate a multiplicity of revenue streams subject to local market conditions including, but not limited to, for example, any one or more of the following:
1. Wholesale market participation:
   a. Energy arbitrage—buy power (charge battery) when the price is low and sell power (discharge battery) when the price is high
2. Buy and sell with the market operator or in an established energy or capacity market:
   a. Peak generation capacity when wholesale energy prices are high
   b. Frequency control services.
      i. An example of which is frequency control ancillary services (FCAS) in the NEM which includes the following services:
         1. 6 second raise
         2. 60 second raise
         3. 5 minute raise
         4. 6 second lower
         5. 60 second lower
         6. 5 minute lower c. System restart services.
  i. An example of which is system restart ancillary service (SRAS) in the NEM.
3. Services to Distribution and Transmission Networks:
  a. Network support contracts—firmer alternative to demand response/demand management (e.g., a the ability to supply energy/power as needed by the network companies to overcome local constraints, avoid replacing old transformers, etc.).
  b. Voltage regulation, including reactive voltage support in distribution networks.
  c. Electricity feeder capacity support during electric vehicle (EV) charging using stationary electricity storage installed at a residence
  d. Management of reverse current in distribution networks through the tactical use of introducing load through electricity storage charging
4. Creation of Financial Instruments:
  a. Hedge contracts—Financial hedge provision using the real-time aggregate and available state of charge from a collection of storage systems as the counterparty to the hedge.
  b. Forward contracts for the provision of real or reactive power potentially based on predicted available state of charge from a collection of storage systems.
  c. Derivative contracts for the provision of real or reactive power potentially based on predicted available state of charge from a collection of storage systems.
  d. Option-Dispatch contracts—Contracts which include a price for the option of dispatching energy, for a given duration, during a particular time interval and then a price for actually dispatching the energy storage system during that time interval, for the requested duration.
5. Distribution network and other interested parties may purchase the following:
  a. Smart electricity meter data provision.
6. Black start capabilities—Provision of real or reactive power, or energy, in order to re-energize the electricity network in case a system-wide fault causes it to go 'dark'.
7. The ability to control appliances at a commercial or residential premises based, in part, on the state of the energy storage system (e.g., air conditioners, lights, etc.)
8. The ability to provide home automation capabilities and services as it relates to the control/use of the energy storage system. (e.g., a market enabled power point, market enabled lighting that determines the color of lights based on the current price of energy.)
9. The ability to orchestrate the delivery of spatially (e.g. geographically) and temporally correlated real and reactive power, or energy, using a collection of energy storage systems.
10. Visualization of the operations of an energy storage system for consumers.
11. Peer-to-peer based power and energy services—e.g., give someone free energy from or sell spare energy to someone, or share energy with someone (e.g., similar to family grouping/sharing on mobile phone plans).
12. Ability to sell derivatives based on ancillary services (frequency control, etc.)
13. Ability to sell derivatives based on current state of charge of an energy storage system (or group of energy storage systems)
14. Ability to sell services to renewable energy generators that increase the correlation between their generation profiles and a targeted consumption profile.
15. Predictive modeling of consumption profile in residential and commercial premises.
16. Ability to use ripple control for protection of commercial or residential premises with energy storage systems.
17. Enable customers to make decisions about consumption or energy storage system operation based on real time state of charge and market information.
18. Ability to deliver services across multiple electricity phases, or to balance energy, power, angle between phases. Ability to provide precise time based energization of bus bars across phases using multiple energy storage systems.
19. Probabilistic connection point modeling for electric vehicles. Ability to operate storage in electric vehicles when it is available and not otherwise. Potential to control it across various geographies as it moves about.
20. Ability to operate energy storage systems to counteract behavior of residential or commercial premises, in regards to the grid.
21. Using waveform data obtained from a commercial off the shelf meter to determine the current frequency of the grid and use that to deliver frequency based services. This relates to the provision of frequency control services where an approved frequency trigger is necessary.

Additionally, to successfully participate in the energy markets, in exemplary embodiments, it may be desirable to understand how metering is performed. For example, in many energy markets, energy usage is charged over a period of time, not instantaneously. Accordingly, knowledge of the market time intervals may enable energy storage control software to reduce oscillatory loads and increase (or maximize) financial (or other) returns. In particular, because energy usage is charged over a period of time (and the tariffs for import and export are not generally equal), it is possible to import and export energy at the same time and this may be less than optimal in certain situations. By accounting for these time intervals, it is possible for the control software to adjust the transition times for importing and exporting to increase the return for the user. In other words, the control algorithm may account for the manner in which metering is performed by the system when determining the optimal action of the energy storage system.

In exemplary embodiments it should be understood that the control algorithm and/or optimizer may take into account the behavior, operation and/or measurement techniques of the meter, battery management system, battery, and/or inverter when optimizing (or improving) the behavior of the energy storage system. The control algorithm and/or optimizer may also take into account the behavioral constraints, operational constraints or measurement constraints of the meter, battery management system, battery, and/or inverter when optimizing the behavior of the energy storage system.

FIG. 1 is an exemplary embodiment of a system for managing an energy storage system. In particular, FIG. 1 is an exemplary embodiment of a software environment but as would be understood by persons of skill in the art, software, hardware and combinations of the two may be utilized to build the systems and devices described herein. In FIG. 1, the system 100 comprises an analysis environment 102. The analysis environment 102 may be implemented as a server side portion of the system and in exemplary embodiments, may be responsible for developing customer specific control models in conjunction with an appropriately trained person (data analyst/control engineer).

As discussed elsewhere herein, the system includes the design of a set of customer-specific models for managing and/or controlling the energy storage system at the customer premise.

The analysis environment 102 may be thought of as a "sand box" for developing/crafting (in many different ways) customer-specific models or computational graphs for customer control models. The analysis environment 102 may be where data is analyzed, algorithms are trained, transformations are developed, parameters are defined, and/or items are configured. As inputs, the analysis environment 102 may utilize customer-specific data, including, for example, the location of a specific customer, their system configuration, etc. In exemplary embodiments, this data may be obtained from a customer relationship management (CRM) system 104, discussed below. The analysis environment 102 may also utilize time-series data, including, for example: (a) historical energy market data 112 (e.g., energy price fluctuations, etc.); (b) environmental data 114 (e.g., sun/cloud conditions per region, temperature, wind speed and direction, etc.); and (c) and other data 116.

As its output, the analysis environment 102 may produce a customer-specific graph/model that contains e.g., the final executable code to implement the control system on the customer's energy storage system. The executable code may be deployed to the client device and metadata about the customer specific model and the executable code may be stored in the EC (Embedded Compute) data database 106.

In exemplary embodiments, a time series database 108 may be utilized to collect and store data from a variety of different sources including, for example: electricity usage and generation (e.g., solar, wind, etc.) from the commercial or residential premises, energy markets information, information from electricity networks (transmission and distribution) and utilities, weather services, financial data including (e.g., macro and micro economic data, etc.), and/or other indicator variables that include, but are not limited to, time of day, day of week/month/year, market period, etc.

In exemplary embodiments, after data is collected it may be cleaned and/or sanitized to validate that it is complete (i.e. at the appropriate time intervals) and sane (i.e. is it within appropriate bounds). For example, in certain embodiments, server and/or client programs that run on the servers may either poll for new data or send it directly via standard web based protocols. The data may be checked using some predefined rules and then any missing or "bad" data (e.g., data that doesn't meet the rules) may be replaced using data replacement rules. Data can be received in different serialization formats and may be stored in a serialization format by the databases (e.g., both time series and SQL). In exemplary embodiments, the underlying value of data may not be changed unless it is missing or "bad".

In exemplary embodiments, the output of the control system/optimizer may be sent to the time series database 108 and it is also possible to use that data to provide visual (or audible) indications to a user. For example, in exemplary embodiments, the data may be utilized to determine a color and/or intensity of certain lights, or other types of display, that exist on the embedded compute controllers. This allows the system to create an ambient display showing the status of the battery, solar energy, usage etc. as well as possibly giving suggestions to consumers about whether they should be saving or using energy at that time.

In exemplary embodiments, the CRM (and/or time-series database) 104 may store details about customers, their energy usage and other metrics, and configuration and characteristics of their energy storage systems and energy generation capabilities. The information may also include their address, contact details, electricity retailer and retail contract, network provider and network contract, energy production system (where applicable), energy storage system (where applicable), etc. In exemplary embodiments, two commercial or residential premises next door to one another might have vastly different control systems in place so the physical locations of the two may be important.

In exemplary embodiments, the systems and devices may further comprise signaling systems 110. When data becomes available to the system (e.g., changes in the spot price from a centralized energy market), it may be desirable to immediately transfer the data to the modules/processes of the customer's system that require the data. In other words, a market event may be sent to the centralized servers where it may be published out to the controllers so they can update what the storage system is currently doing. The signaling system may be configured to accept data in any form it is available from outside systems (e.g., from centralized energy markets, distribution network companies, etc.), convert it into an appropriate form, and then send the data out using a variety of different protocols to other system modules/processes. In exemplary embodiments, the signaling system 110 may be a data translation and/or data packaging system.

As illustrated, the system may also include the energy storage system (ESS) 118. In exemplary embodiments, the ESS may contain one or more of energy storage cells or batteries, battery management systems, inverters, meters, etc.

FIG. 1 also illustrates interaction of the network service providers systems 120 with the system. In exemplary embodiments, the network service providers may comprise systems or processes operated by network service providers (e.g., distribution or transmission providers). These systems may include distribution management systems, demand response (DR) systems, dispatch systems, etc. and the systems described herein may interact with these network service providers to enable services for these network service providers. In exemplary embodiments, these services may include, energy and power to avoid constraints on the network at peak usage or times of the day and/or the ability to avoid replacing aging infrastructure by dynamically off-setting loads and generators by utilizing an energy storage system.

FIG. 1 also illustrates the interaction of the system with market systems 122. Market systems are systems or processes operated by an energy market. For example, these systems may include bidding and settlement systems, etc. The systems, methods, and devices described herein may interact with these systems to enable services for the energy market. In exemplary embodiments, these services may comprise the provision of energy (kWh), real and/or reactive power (kW/kvar) or ancillary services (typically power (kW)).

The EC data database 106 may contain information about the executable code that runs on the data table engine 200. As discussed above, the information stored in the EC data database 106 was created in the analysis environment 102.

In exemplary embodiments, the EC data database may comprise different types of data. For example, in embodiments, the data may include parameters. Parameters are uniquely named objects that contain information about a particular source of data. In exemplary embodiments, parameters may be uniquely mapped to time series database metrics. Another type of data that may be stored in the EC data database includes transformations. Transformations are methods that transform one parameter into another. For example, a given transformation might convert the current temperature (a parameter) and wind speed (another parameter) into apparent temperature (a third parameter). Transformations can do other things with data as well, which may include sending the data onwards to other systems, setting values in the energy storage system, etc.

Another type of data that may be stored in the EC data database includes configuration items. Configuration items are typically derived from the CRM system that are used to parameterize transformations and parameters. For example, a configuration item might contain information about the wholesale market region that a given energy storage system purchases power from and/or details about the energy storage systems specifications at a given residence and/or details about the time of use tariff for retail/network contracts.

In exemplary embodiments, the system may also comprise post operation settlement and analysis tools 124. Specifically, during (or after) a client control system is running it is necessary to understand the performance and settlement revenues that have arisen because of the operation. In exemplary embodiments, these tools may be software (e.g., scripts) that convert data about the operation of an energy storage system into information about settlement revenues, performance, etc. In exemplary embodiments, these tools may also allow for the visualization of operational data.

The data table engine 200 is the core operational analysis and control portion of the system. In exemplary embodiments, the data table engine 200 may be responsible for executing the control model and corresponding code that is created in the analysis environment 102. In exemplary embodiments, the data table engine 200 may have four modes of operation—historical, accelerated real time simulation, real time deployed, and cloud deployed (real time simulation).

In historical mode, the data table engine 200 may calculate the economic value that an energy storage system can deliver (from savings and additional revenue streams) at a connection point in the electricity network using historical data in bulk analysis mode (i.e. all data is available before analysis is undertaken).

In accelerated real time mode, the data engine table 200 may simulate control of an energy storage system in order to deliver savings and additional revenue streams at a connection point in the electricity network. In exemplary embodiments, the control system may use historical data but simulate real-time data flows, i.e., presenting the data to the system as though it is coming in real time.

In real time deployed mode, the data table engine 200 controls an energy storage system in order to deliver savings and additional revenue streams at a connection point in the electricity network.

In cloud deployed mode, the data table engine 200 may operate in a manner that is similar to the real time deployed mode but operates in cloud based servers rather than deployed to an embedded processor at the energy storage system. In exemplary embodiments, this may allow either real-time simulation or can be used to control energy storage systems with an internet enabled control system.

As discussed above, in exemplary embodiments, the control system may be operated from a central location and the commands may be sent to the individual energy storage systems in a distributed fashion. In exemplary embodiments, the distributed operation may comprise sending instructions to individual energy storage systems or to groups of systems such as those systems in a certain geographic region. Additionally, it is not necessary that each individual system comprise an individual meter. In exemplary embodiments, meters may be centralized, partially centralized or completely decentralized.

In the cases above the goal may be to generate a control signal (e.g., charge/discharge decisions) for the energy storage system. In exemplary embodiments, this control signal may directly determine the state of charge of the energy storage system, as well as determining the net flow of energy into or out of the electricity network at the connection point. In exemplary embodiments, the system may use a financial optimization algorithm to determine what to do at various points in time. For example, as prices (i.e., wholesale energy prices) become available, the optimizer may use that information to determine which action is most valuable and then implement that action through the control system.

In exemplary embodiments, customers in the CRM 104 have a unique identifier and the data table engine 200 may operate on behalf of a single customer. Accordingly, for every customer there may be at least one data table engine 200 running depending on which operational modes (of the four listed above) are currently in use.

Figure 2:
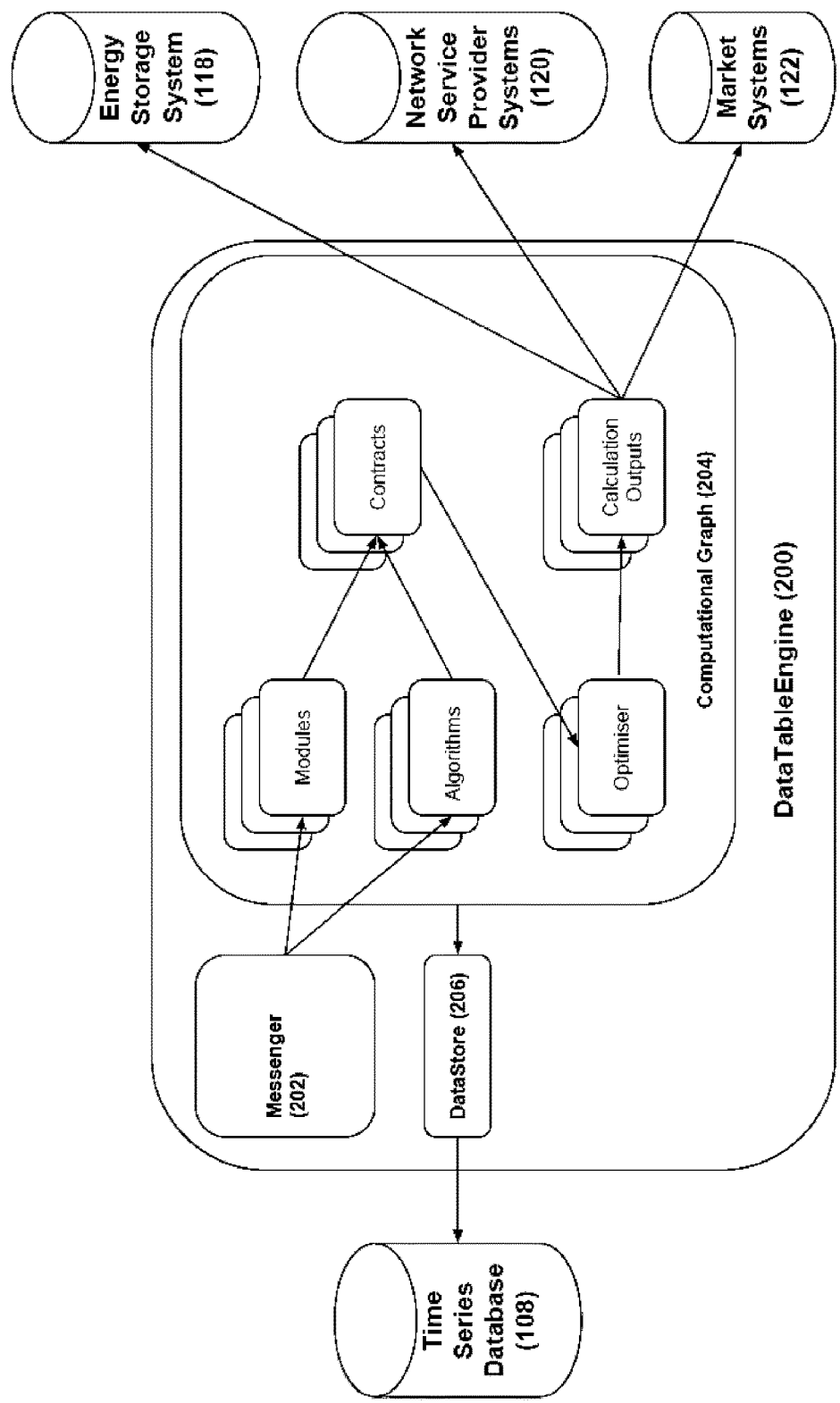
FIG. 2 is an exemplary embodiment of a data table engine for use with a system for managing energy storage systems.

FIG. 2 is an exemplary embodiment of a data table engine 200 for use with a system for managing energy storage systems. As illustrated, the data table engine 200 consists of three main components—a messenger 202, a computational graph 204, and a data store 206.

In exemplary embodiments, the messenger 202 may be implemented in any of a plurality of manners (i.e., how it accepts data being sent to it or how it retrieves data when in historical mode). The messenger 202 is the primary interface to devices outside of the system. In exemplary embodiments, the messenger 202 may be configured to know how to listen for events/data (e.g., based on data retrieved from the EC data database 106). The messenger 202 may listen for multiple events simultaneously (including internally sent messages from within the computational graph). In exemplary embodiments, for each event that the messenger 202 is listening for, it may have an event handler registered. The event handler may receive the event, process it, and then make that data (e.g., wholesale energy prices) available for processing with the computational graph.

The computational graph 204 is where the control system is primarily implemented. In exemplary embodiments, there may be a plurality of code modules that run within the computational graph. The order of calculation of the code modules may be determined by first building a graph that links modules together as specified by their input and output parameters.

Accordingly, in exemplary embodiments, the control system may be a combination of the graphical structure of the transformations and parameters, both of which are parameterized by the configuration data. This approach may allow the system to ensure that each date table engine 200 is running a unique control system for each customer, while ensuring that it is not necessary to individually write a new control system for each deployment. Since code modules can be reused and reordered in different systems this may be an efficient manner of building unique control systems for large numbers of operational units.

The data store 206 is an internal store of all of the data that has been delivered to the data table engine 200 (e.g., from events or from reading from the energy storage system, etc.) or that has been derived (e.g., transformed) from this data. When data arrives from an event it is stored in the data store and then after each transformation that parameter value is also stored. Periodically the data store may synchronize this data with an external database so the system has a record of all operational data. This type of a backup may be useful for any number of reasons such as being able to recreate past instances of the data. Data compression techniques may be used to provide lossless or lossy compression in case of bandwidth constraints between the data table engine and the external database.

In exemplary embodiments, the systems, methods, and devices may be capable of controlling the battery in real-time and may have one or more of the following capabilities:

1. Receives code modules and algorithms designed for each specific energy storage system from the analysis environment.
2. Uses a proprietary computational graph methodology to optimize real time performance.
3. Collects (or sends) periodic data from the electricity market and other required sources (through market interaction systems, the central database system and other local (e.g., electricity meter) and remote sources). This data may include but is not limited to:
   a. Price signals in the wholesale energy market or ancillary services market.
   b. Price signals in the distribution network.
   c. Operational conditions (e.g., capacity, faults, etc.) in the transmission or distribution networks.
   d. Generation capacity, constraints, and faults of generators connected to the transmission or distribution networks.
   e. Operational requirements, consumption, or usage patterns of an individual residence or premises connected to the distribution network.
   f. Price signals in the retail contract of an individual residence or premises connected to the distribution network.
   g. Environmental factors (e.g., temperature, wind speed, etc.)
   h. Contracts for energy storage services.
4. Utilizes the data as inputs for running code modules and algorithms in the deployed controller from the analysis environment.
5. Utilizes the code modules and algorithms to determine the value of commanding an action and/or magnitude (e.g., charge, discharge, do nothing) for the storage system for each of the many possible services each energy storage system is delivering.
6. Determines an 'optimal' action (e.g., charge, discharge, do nothing) and/or magnitude for the energy storage system over a finite time horizon.
   a. The optimization process may automatically take into account the implications of delivering multiple services simultaneously. For example, provision of service A may reduce the ability to physically provide service C.
   b. The trading algorithm may also calculate opportunity costs because the provision of a service now may preclude the provision of services later—after all there are energy storage constraints such as an empty or full battery.
7. Communicates bids for some market services to the market interaction systems, as necessary.
8. Executes instructions to energy storage systems in order to achieve revenue streams anticipated during the optimization.
9. Logs local measured data of what actually happened.
10. Saves the outputs of code modules and algorithms and uploads them to a centralized data repository where further processing and performance analysis may take place.
11. The data table engine may operate without communications capabilities using an automated and proprietary redundancy system.

In exemplary embodiments, the data table engine may respond to events from a variety of sources including, for example, market pricing events, events from the analysis environment or from local systems/hardware.

In exemplary embodiments, trading algorithms may be updated remotely—e.g., incremental improvements may be made at the central compute which deliver higher expected returns or less risk to returns.

In exemplary embodiments, the system may be aware of characteristics unique to the battery systems including, for example, response time and ramp rates and exploit this knowledge during the optimization phase.

In exemplary embodiments, the analysis environment may comprise a central computational, storage and optimization facilities that may be used to:

1. Retain a copy of data sent to, and received from, the remote controller. This may include an automated data provenance capability to ensure that the remote controller devices are executing the correct code, as well as ensuring that the energy storage systems are being operated in a manner that allows them to generate revenue equal to that predicted by prior simulations.
2. Analyze the value of operating energy storage, delivering an arbitrary combination of energy (kWh) and capacity (kW) services simultaneously, at a given location, residence or premises and with performance properties of the battery, power electronics, connection point, geographical location, installed or prospective loads, installed or prospective generation, and any other connection point, or connection point supporting information to be accurately calculated from historical data without installing an energy storage device.
3. Automatically generate optimization code modules and algorithms for the energy storage systems based on analysis of historical data or from data received from remote controllers in the field to ensure it can generate revenue equal to that predicted by prior simulations.
   a. This can include automating the development of new trading algorithms prior to deployment then remotely uploading them to each embedded compute in each distributed energy storage system.
   b. The quantity of historical data may naturally increase over time allowing the trading algorithms to be better trained. The trading algorithms may be trained on a significant part of the data then tested on the remaining historical data. The omission of some of the historical data in the training process allows for a more realistic test of the trading algorithm's performance on real data it has never seen before. The training of the algorithms may be resource-intensive and may thus be done in the central computer system.
4. Transform the rules, regulations, financial value and engineering constraints inherent in the provision of a specific electricity grid service (a contract) into a programming code module with a common interface.
5. Dynamically add and remove electricity grid service provision to remote controller devices in response to new and expired contracts.

6. Calculate (probabilistically) available kWh and kVA at a point in time, in response to predicted usage (with confidence interval), predicted generation (with confidence interval), predicted weather, predicted electricity system state, etc. at a specific connection point (virtual storage provided by uncontrolled, but predictable load and generation).
7. Calculate (probabilistically) available kWh and kVA at a point in time depending on the predicted or measured availability of an electric vehicle (EV) at a specific connection point. Can predict when the EV will be available, and how many kVA/kWh will be available upon connection.
8. Synthesize kWh and kVA available at a point in time from the aggregate probabilistic kWh and kVA available from a collection of independent electricity storage systems, demand response and other demand side resources.
9. Automate modeling of storage performance changes with time, temperature, kWh though, etc.—able to cater for differing chemistries, power electronics, etc., but take a whole-of-storage-system perspective In exemplary embodiments, the control system may be configured to receive sufficient data after turning on or rebooting such that the system can recover its previous state. For example, in exemplary embodiments, if the control system requires a reboot, the system may be configured such that it receives a sufficient amount of data to recover its state before the reboot, or at least substantially recover its state.

While embodiments of the system have been shown and described herein, it will be obvious to those skilled in the art that such embodiments are provided by way of example only. It is intended that the following claims define the scope of the invention and that methods and structures within the scope of these claims and their equivalents be covered thereby.

What is claimed is:

1. A method for controlling an energy storage system, the method comprising:
   receiving time-series data and customer specific data;
   developing a customer specific control model based at least in part on the time-series data and the customer specific data;
   training the customer specific control model based on a first portion of the time-series data and the customer specific data;
   testing the customer specific control model based on a second portion of the time-series data and the customer specific data; and
   deploying the customer specific control model to the customer for use by the customer to determine which of a plurality of modes the energy storage system should be in.

2. The method of claim 1, wherein the plurality of modes of the energy storage system comprise a charging mode, a discharging mode, and a do nothing mode.

3. The method of claim 2, wherein the plurality of modes of the energy storage system further comprise an indication of the desired net flow of power and/or energy into or out of the energy storage system.

4. The method of claim 1, wherein the customer specific control model is configured to maximize a financial return from the energy storage system by selling energy back to the network at beneficial times as determined by the customer specific control model.

5. The method of claim 1, wherein the customer specific control module can be updated by communicating an update to the customer.

6. The method of claim 1, wherein the control model utilizes customer configuration information to determine which of a plurality of modes and/or corresponding magnitudes the energy storage system should be in.

7. The method of claim 1, wherein a different customer specific control model is developed for different customers.

8. The method of claim 1, wherein the time-series data comprises any combination of historical energy market information, environmental information, electricity usage and/or generation from the commercial or residential premises, weather services, and/or financial data related to macro and micro economic information.

9. The method of claim 1, wherein the customer specific data comprises any combination of the location of the customer, the customer preferences, electricity retail contract information, network provider information, electrical details about the connection point, and/or information about the energy storage system.

10. The method of claim 1, wherein the data is validated prior to being utilized to develop the customer specific control model.

11. The method of claim 1, wherein the energy storage system comprises at least one battery system.

12. The method of claim 1, wherein the customer specific control model comprises a plurality of modules which are configured to be executed in a predetermined manner based, at least in part, on a linked relationship between the modules and output parameters.

13. A system for controlling a plurality of energy storage systems associated with a corresponding plurality of customers, the system comprising:
   at least one storage device configured to store time-series data and customer specific data for a plurality of customers;
   at least one centralized processor configured to:
   (i) receive the time-series data and the customer specific data for a plurality of customers;
   (ii) develop a customer specific control model for the plurality of customers based at least in part on the time-series data and the customer specific data of the corresponding customer; and
   (iii) train the customer specific control model based on a first portion of the time-series data and the customer specific data;
   (iv) test the customer specific control model based on a second portion of the time-series data and the customer specific data; and
   a plurality of controllers associated with a corresponding plurality of customer energy storage systems, wherein the plurality of controllers is configured to receive a corresponding customer specific control model to determine which of a plurality of modes the energy storage system corresponding to the customer should be in.

14. The system of claim 13, wherein the plurality of modes of the energy storage system comprise a charging mode, a discharging mode, and a do nothing mode.

15. The system of claim 14, wherein the plurality of modes of the energy storage system further comprise an indication of the desired net flow of energy into or out of the energy storage system.

16. The system of claim 13, wherein the customer specific control model is configured to maximize a financial return from the energy storage system by selling energy back to the network at beneficial times as determined by the customer specific control model and other services.

17. The system of claim 13, wherein the customer specific control module can be updated by pushing an update to the customer.

18. The system of claim 13, wherein the customer specific control model utilizes customer configuration information to determine which of a plurality of modes the energy storage system should be in.

19. The system of claim 13, wherein the time-series data comprises any combination of historical energy market information, environmental information, electricity usage and/or generation from the commercial or residential premises, weather services, and/or financial data related to macro and micro economic and other data.

20. The system of claim 13, wherein the customer specific data comprises any combination of the location of the customer, the customer preferences, electricity retail contract information, network provider information, electrical details about the connection point, and/or information about the energy storage system.

21. The system of claim 13, wherein the data is validated prior to being utilized to develop the customer specific control model.

22. The system of claim 13, wherein the energy storage system comprises at least one battery.

23. The system of claim 13, wherein the customer specific control model comprises a plurality of modules which are configured to be executed in a predetermined manner based, at least in part, on a linked relationship between the modules and output parameters.

24. The system of claim 13, where in the energy storage system interfaces to at least one distributed energy generation system.

25. A system for controlling a plurality of energy storage systems associated with a corresponding plurality of customers, the system comprising:
- at least one storage device configured to store time-series data and customer specific data for a plurality of customers;
- at least one centralized processor configured to:
  (i) receive the time-series data and the customer specific data for a plurality of customers;
  (ii) develop a plurality of customer specific control models for the plurality of customers based at least in part on the time-series data and the customer specific data of the corresponding customer; and
  (iii) train the plurality of customer specific control models based on a first portion of the time-series data and the customer specific data;
  (iv) test the customer specific control model based on a second portion of the time-series data and the customer specific data; and
- a plurality of controllers associated with a corresponding plurality of customer energy storage systems, wherein the plurality of controllers is configured to receive a corresponding plurality of customer specific control models to determine which of a plurality of modes the energy storage system corresponding to the customer should be in.

* * * * *